United States Patent Office 2,941,962
Patented June 21, 1960

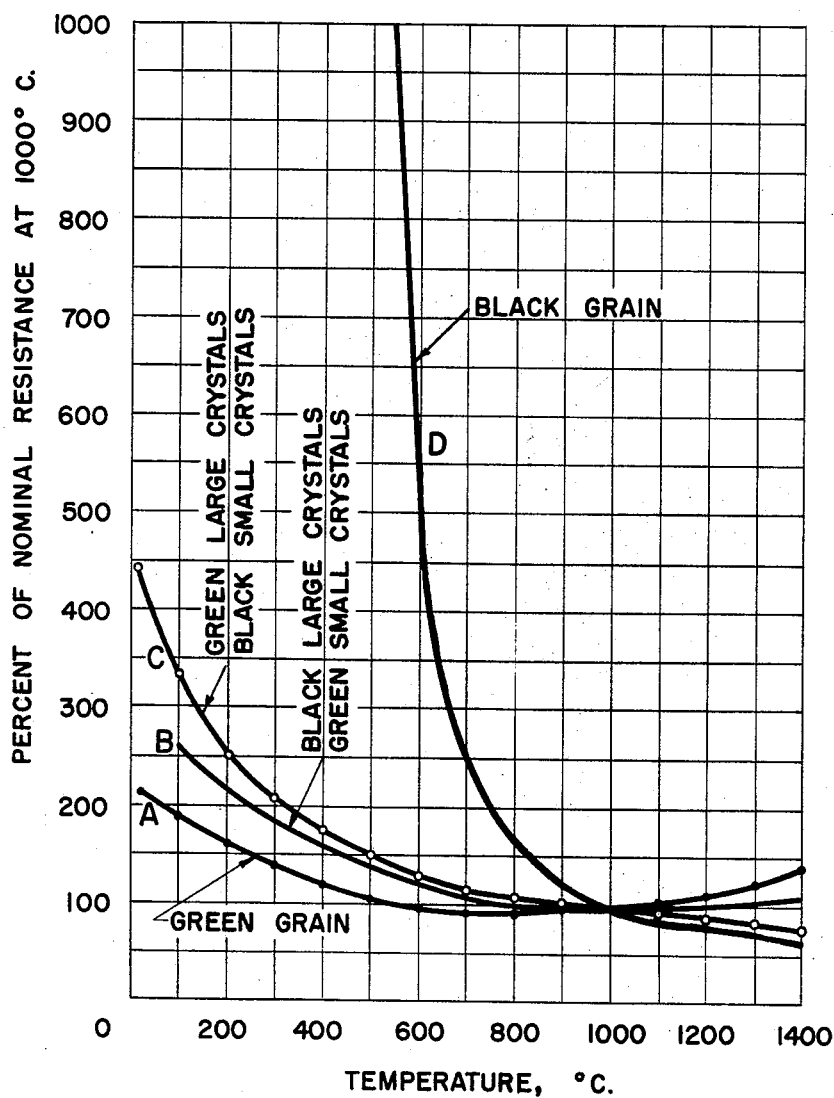

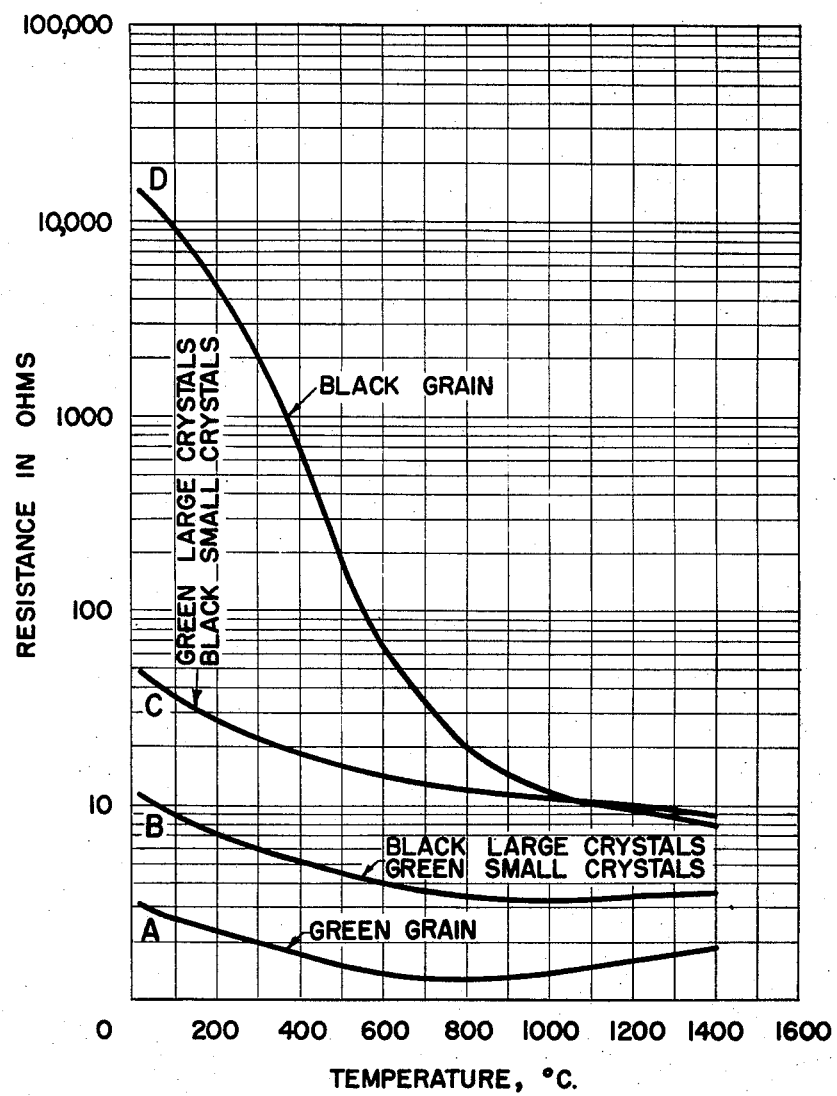

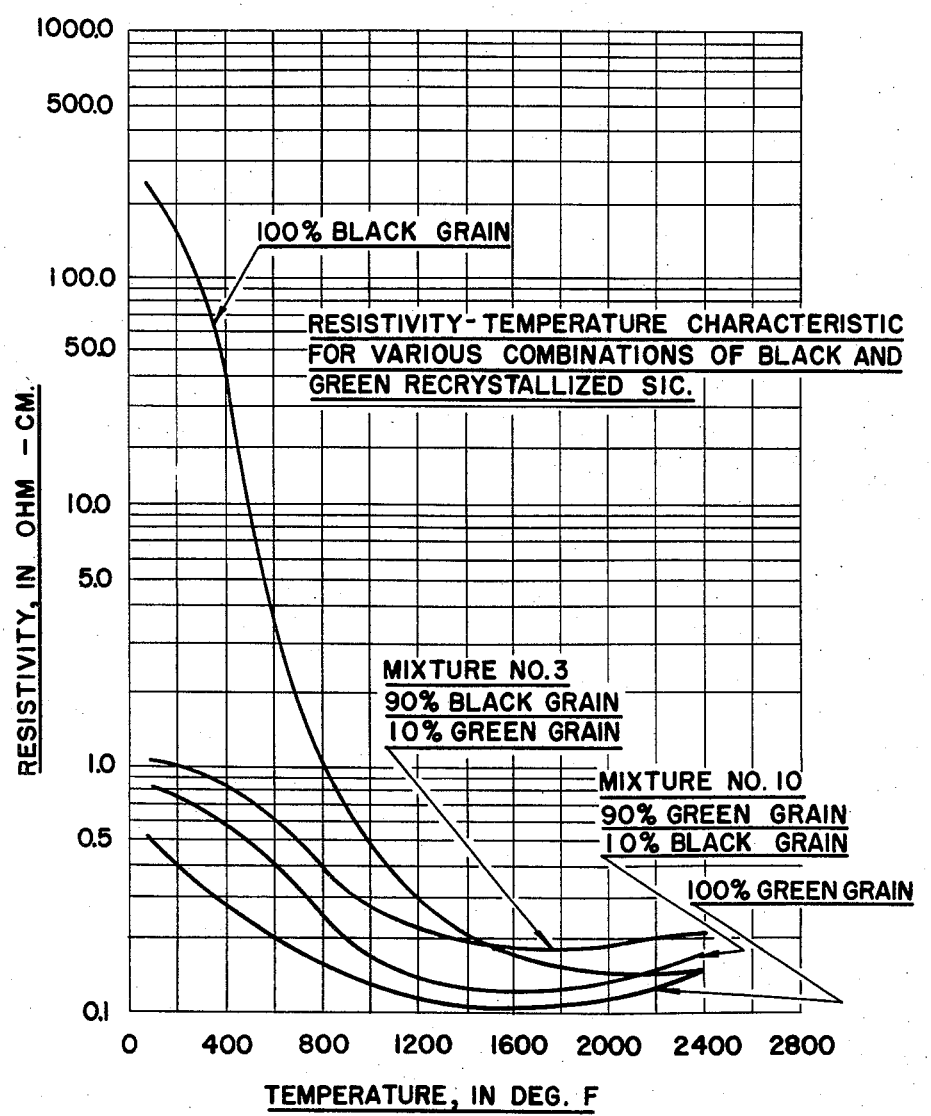

2,941,962

SILICON CARBIDE RESISTOR BODIES

Roland R. Van Der Beck, Jr., Greensburg, Pa., assignor to The Carborundum Company, Niagara Falls, N.Y., a corporation of Delaware Filed Feb. 17, 1958, Ser. No. 715,995

13 Claims. (Cl. 252—516)

This invention relates to silicon carbide resistance bodies and their manufacture, and particularly to self-bonded silicon carbide resistance bodies having commercially desirable electrical properties.

This application is a continuation-in-part of my co-pending application Serial No. 514,577, filed June 10, 1955, and now abandoned.

Silicon carbide in the various forms in which it is commonly known does not always possess electrical characteristics which make it adaptable for use as an electrical resistance type heating element. Silicon carbide exists in two major crystalline forms, one of which is often referred to as the "low-temperature or beta" form of silicon carbide. It is relatively unstable, converting at high temperatures to the second and more well-known commercial variety of silicon carbide. This latter variety is of hexagonal crystal form, is made in tonnage quantities in huge industrial furnaces, and finds widespread application as an abrasive and refractory material. It is this latter variety and its use in the manufacture of electrical resistance bodies with which the present invention is concerned.

It is further known that the above-named commercial form of silicon carbide is available in two general classifications or varieties commonly known in the trade as "black" grade silicon carbide and "green" grade silicon carbide. The so-called "black" grade of silicon carbide is the more common of the two and is generally acceptable for the manufacture of abrasive and refractory products where hardness and/or resistance to corrosion or erosion at high temperatures are the prime requirements. However, in the manufacture of electrical resistance bodies, such as those for use as electrical resistance heating elements, the "black" type of silicon carbide has heretofore been found unsatisfactory because of its extremely high negative resistance temperature characteristics. In other words, at room temperature its electrical resistance when formed into a self-bonded body by recrystallization procedures, is inordinately high and the electrical resistance of the body decreases excessively with increase in temperature up to normal operating temperatures. Consequently, the so-called "green" grade of silicon carbide which is of higher purity than the "black" grade and is more expensive to make has been generally adapted for the making of silicon carbide electrical resistance bodies such as those used for electrical resistance heating elements. However, while the "green" variety of silicon carbide has been preferred over the "black" variety because of its relatively low negative resistance temperature characteristics, its specific electrical resistance at operating temperatures (ohms per cubic centimeter) when self-bonded by recrystallization into bodies suitable for heating elements and other electrical uses is relatively low and much below that most desired for many industrial applications.

Regardless of whether silicon carbide is of the "black" or the "green" variety, in the manufacture of the material in large furnaces the resulting product is obtained from different parts of the furnace crust in the form of a porous aggregate of crystals which are more or less perfectly developed in regard to external form, and in the usual silicon carbide furnace every effort is made to produce a material having this open crystalline character. Under certain conditions of furnace operation it is also possible to produce silicon carbide in the form of more densely compacted masses practically devoid of external crystalline form. Silicon carbide of this physical variety is characterized by a higher apparent density in lump form. The customary practice in the past in the making of silicon carbide electrical resistance bodies has been to select and use this compact variety of silicon carbide in preference to the more ordinary porous aggregate of crystals, although satisfactory resistors have been made from mixtures of the compact variety with the ordinary more porous variety when the both varieties were the green grade of silicon carbide.

There has been a constant effort for many years in the making of silicon carbide electrical resistance bodies of the type used as resistance type heating elements to find ways and means of making such bodies so that they will have low negative resistance temperature characteristics and will also have a reasonably high level of electrical resistance over the entire range of operating temperatures. Such a combination of properties has heretofore been obtained only through the use of green silicon carbide and even so there has been an upper limit to the level of electrical resistance which could be obtained consistently with good results and properties in other respects. Attempts have been made to increase the specific resistance of such bodies by adding small percentages of chemicals. Elements made by adding chemicals to green grade silicon carbide have proven to be very variable after burning and manufacturing losses very high. They are very variable, moreover, in their resistance to oxidation and other corrosive and erosive conditions. Consequently, elements with a resistivity higher than about 0.1 ohm/cm.[3] have never found commercial use except in so-called "domestic" applications where the temperature and conditions of operation are very mild.

It is an object of the present invention to meet the need for a silicon carbide electrical resistance body having an improved combination of electrical resistance characteristics over its entire temperature range of use to enable it to be used in severe industrial as well as domestic applications.

The invention also has for its object the production of a resistance body with improved electrical properties.

It is a still further object to provide a silicon carbide resistance body, useful as a resistance heating element, combining a low negative resistance temperature characteristic with relatively high electrical resistance over its operating temperature range.

Other objects and advantages accruing from the present invention will become apparent as the description proceeds.

I have discovered that silicon carbide electrical resistance bodies having a combination of electrical resistance characteristics that make them highly satisfactory as electrical resistance heating elements can be made from the "black" variety of silicon carbide when it is used in conjunction with the "green" variety of silicon carbide in the manner hereinafter set forth. The presence of the green silicon carbide in the body, even in amounts as low as about 5% by weight of the body, has been found, surprisingly, to destroy or at least compensate for the otherwise highly negative resistance temperature characteristics of the black silicon carbide grain so that, despite the presence of the black silicon carbide in the body, the final recrystallized body has an acceptably low negative resistance temperature characteristic. At the same time the presence of the black variety serves to increase the specific electrical resistance of the body over its normal operating temperature range above the resistance normally obtained with a similar recrystallized silicon carbide body in which green silicon carbide alone is used. The resulting body is therefore a recrystallized silicon carbide resistance body of the heating element type possessing the highly desirable combination of electrical properties of a low negative resistance temperature characteristic and a relatively high electrical resistance at operating temperatures.

In the drawing, which is intended to merely assist in illustrating the invention and not to limit the same:

Figure 1 is a graph showing the different negative electrical resistance-temperature characteristics of several silicon carbide resistance bodies, contrasting the electrical resistance-temperature characteristics of resistors made in accordance with the herein described procedure with the electrical resistance-temperature characteristics of resistors using either black silicon carbide grain alone or green silicon carbide grain alone;

Figure 2 is a graph showing the different levels of electrical resistance of the several silicon carbide resistors of Figure 1; and Figure 3 is a graph showing the different negative electrical resistance-temperature characteristics of several silicon carbide resistance bodies, the specific resistance in ohms/cm.$^3$ being plotted against temperature in degrees Fahrenheit between 100° F. and 2400° F. The curves bring out the contrast in resistance-temperature characteristics of resistors made in accordance with the herein described procedure with the resistance-temperature characteristics of resistors using either black silicon carbide grain alone or green silicon carbide grain alone.

Except for the variation in green and black silicon carbide as noted on the graphs, the original make-up of the bodies under comparison in each figure of the drawings, i.e. the percentage distribution in various size classifications, was identical.

In making silicon carbide resistance bodies according to the present invention, I use a mixture of black silicon carbide and green silicon carbide and in conformance with customary practice in the making of silicon carbide resistance bodies for use as electrical resistance heating elements the silicon carbide used in forming the molded homogeneous body is a blend of grit sizes ranging from coarse grit silicon carbide to fine grit silicon carbide. The distinction between coarse grit and fine grit is somewhat arbitrary, of course. The important point to bear in mind is that a mix should contain both relatively coarse and relatively fine grits in substantial proportions. Intermediate sizes are usually included also to better utilize those sizes of grain and to balance the body, but their function is less vital and their effect on the electrical properties not as great as the effect of the coarsest and finest fractions. This blended mixture of coarse and fine grit sizes of silicon carbide, when made in accordance with the teachings of the present invention using a mixture of black and green silicon carbide, is prepared by selection of coarse grit silicon carbide which is predominantly, and preferably substantially entirely, of the one variety of silicon carbide, e.g., black grade silicon carbide, together with a fine grit silicon carbide predominantly, and preferably substantially entirely, of the second type, e.g. green grade silicon carbide. For example, supposing it is desired to make a silicon carbide resistance body having a specific electrical resistance at an operating temperature of, e.g., 1000° C. of around 0.2 ohm per cubic centimeter, I select a mixture of about 50% by weight of coarse grit black silicon carbide ranging from a very coarse grit fraction 12–40 mesh size to a relatively coarse fraction 100–140 mesh size and about 50% by weight of fine grit green silicon carbide ranging from a relatively fine fraction 200–325 mesh size to a very fine particle size silicon carbide 325 mesh and finer. The mesh sizes are according to U.S. Standard Sieve specifications. The exact percentage depends to a minor degree, of course, on the electrical properties of the particular black and green silicon carbide chosen.

On the other hand, if it is desired to make a resistance body having a substantially higher specific electrical resistance in the neighborhood of 0.6–0.8 ohm per cubic centimeter at, e.g., 1000° C. I select a mixture of around 50 parts by weight coarse grit size green silicon carbide such as a blend of grit sizes of different degrees of coarseness as specified above and about 50 parts by weight of fine grit size black silicon carbide such as a blend of the aforedescribed type. Other proportions of coarse black silicon carbide and fine green silicon carbide, or vice versa, or mixtures of coarse black silicon carbide and coarse green silicon carbide together with a fine green silicon carbide or a fine black silicon carbide, can be used depending upon the level of specific resistance at operating temperatures desired and the degree of negativity of the electrical resistance temperature characteristic which can be tolerated for the specific end use in mind. Also, the particle sizes of the coarse and fine silicon carbide can vary from the specific mesh sizes mentioned above without departing from the present invention.

The following are two typical specific examples of mixtures of coarse black silicon carbide and fine green silicon carbide (Example 1) and coarse green silicon carbide and fine black silicon carbide (Example 2) that have been satisfactorily used in carrying out the present invention. The 12–40 mesh and 100–140 mesh fractions of the examples are representative of the coarse sizes of silicon carbide whereas the 325 mesh and finer and the 200–325 mesh are classed or considered as fine grit size fractions.

EXAMPLE 1

| | Grams |
|---|---|
| Black silicon carbide, 12–40 mesh | 360 |
| Black silicon carbide, 100–140 mesh | 200 |
| Green silicon carbide, 200–325 mesh | 360 |
| Green silicon carbide, 325 mesh and finer | 240 |

EXAMPLE 2

| | |
|---|---|
| Green silicon carbide, 12–40 mesh | 360 |
| Green silicon carbide, 12–40 mesh | 240 |
| Black silicon carbide, 200–325 mesh | 360 |
| Black silicon carbide, 325 mesh and finer | 240 |

I have found that a low negative electrical resistance temperature characteristic in silicon carbide resistance bodies made in accordance with the present invention is most effectively obtained by the use of a mixture of black grade silicon carbide in coarse grit size or sizes with green grade silicon carbide in the form of the finer grit sizes. When such a combination of coarse black and fine green silicon carbide is used it is found insofar as it can be determined by subsequent examination of the bodies under the microscope, that the fine green silicon carbide particles in the course of the recrystallization of the body constitute the primary or major source of the silicon carbide which recrystallizes. Examination shows that the green silicon carbide forms thin, semi-continuous coatings of recrystallized silicon carbide around the discrete primary particles of coarse black silicon carbide with additional green silicon carbide recrystallizing to form connecting bridges between the discrete particles of green-coated black silicon carbide. This recrystallization and disposition of the fine green silicon carbide within the body of the article has the effect of overcoming the extreme negativity otherwise exhibited by black silicon carbide when the latter is used alone. At the same time, the black silicon carbide lends its relatively high specific electrical resistance characteristics to the final body so that the resulting body structure has a higher electrical resistivity at high temperatures than a body composed entirely of green variety of silicon carbide.

Referring further to Figure 1, the negative electrical resistance-temperature characteristics for several different recrystallized silicon carbide bodies is shown, the percent of nominal resistance at 1000° C. being plotted against temperature. Curve A of the graph shows the desirably low negative temperature coefficient of resistance for a silicon carbide electrical resistance body made according to the prior art and composed entirely of green silicon carbide, the electrical resistance at room temperature being slightly over twice the electrical resistance of the body at 1000° C. In other words, the body has a negative temperature coefficient of electrical resistance factor between room temperature and 1000° C. of slightly over 2. By comparison curve B shows the negative temperature coefficient of resistance for a recrystallized silicon carbide body composed of equal parts of coarse grit size black silicon carbide and fine grit size green silicon carbide made in accordance with the present invention, showing that the electrical resistance at room temperature is approximately only 2½ times the electrical resistance of the body at 1000° C., or a negative temperature coefficient of electrical resistance factor of about 2½. Curve C shows the negative temperature coefficient of resistance for a silicon carbide body also made according to the present invention and composed of equal parts of coarse green silicon carbide and fine black silicon carbide, showing that the electrical resistance at room temperature is slightly less than 4½ times the electrical resistance of the body at 1000° C., or a factor of slightly less than 4½. It can be seen that the two resistance bodies made in accordance with the teachings of the present invention, like the body made entirely from green grade silicon carbide, have satisfactorily low negative electrical resistance-temperature characteristics, that factor being less than 4, and usually around 2 to 3, in the case of bodies composed of coarse black silicon carbide and fine green silicon carbide, and somewhat under 5 in the case of bodies in which the black silicon carbide is used for the fine portion and the green silicon carbide for the coarse portion. Curve D, presented for purposes of comparison, shows the extremely negative temperature coefficient of resistance for recrystallized silicon carbide resistance bodies composed entirely of black grade of silicon carbide, and also shows that the electrical resistance at room temperature is inordinately high, making the body practically unusable as an electrical resistance heating element.

Figure 2 is a graph in which the resistance in ohms for a recrystallized silicon carbide electrical resistance body in the form of a heating element 14" long and ⅜" diameter with a 5" length of heating portion in the middle of the rod is plotted against temperature on semi logarithmic paper. Curve A shows the resistance of such a recrystallized body composed entirely of green silicon carbide at 1000° C. to be approximately 1½ ohms. Curve B shows the electrical resistance in ohms for a similar recrystallized body composed of coarse black silicon carbide and fine green silicon carbide in equal portions by weight to be slightly under 3½ ohms at 1000° C. whereas curve C shows a body composed of coarse green and fine black silicon carbide in approximately equal proportions to have an electrical resistance at the same temperature of around 10 ohms combined with an acceptably low negative resistance-temperature characteristic, as more clearly shown by curve C in Figure 1. By comparison a similar silicon carbide resistance body composed entirely of black silicon carbide has an electrical resistance in ohms of an entirely different order of magnitude being in the neighborhood of several thousand ohms resistance at room temperature and over 12 ohms resistance at an operating temperature of 1000° C., thereby giving it an unreasonably high negative resistance-temperature characteristic.

In order to determine the negative electrical resistance-temperature characteristics to be obtained by use of different proportions of black silicon carbide and green silicon carbide in the mixture of the two varieties in accordance with the teachings of the present invention, a number of additional recrystallized silicon carbide resistance bodies were made and tested. These additional mixes from which the bodies were made are shown in Table I below. All the mixes had the same particle size distribution. The proportion of green silicon carbide grain to black silicon carbide grain ranges from 10% by weight of green silicon carbide and 90% by weight of black silicon carbide in mix #3 to 10% by weight of black silicon carbide and 90% by weight of green silicon carbide in mix #10. The fine fraction of silicon carbide was of the black variety for mixes 3, 4, 5 and 6 whereas green silicon carbide was used exclusively as the fine fraction in mixes #7, 8, 9 and 10. The coarse grit size fraction was exclusively green silicon carbide in mix #6, exclusively black silicon carbide in mix #7, and blends of the two varieties in the remaining mixes.

*Table I*

BLACK AND GREEN GRAIN MIX PERCENTAGES BY WEIGHT

| Mix No. | 54 Grit | | 120 Grit | | 220 Grit | |
|---|---|---|---|---|---|---|
|  | Black | Green | Black | Green | Black | Green |
| 3 | 30 | 10 | 20 |  | 40 |  |
| 4 | 15 | 25 | 20 |  | 40 |  |
| 5 |  | 40 | 20 |  | 40 |  |
| 6 |  | 40 |  | 20 | 40 |  |
| 7 | 40 |  |  | 20 |  | 40 |
| 8 | 40 |  |  | 20 |  | 40 |
| 9 | 25 | 15 |  | 20 |  | 40 |
| 10 | 10 | 30 |  | 20 |  | 40 |

The mixture of silicon carbide material was moistened with 2% of an aqueous methyl cellulose solution and 3% of gum tragacanth as a temporary agglutinant and the resistance bodies formed by extrusion. The resulting bodies were dried and fired in a graphite tube furnace at 2250° C. and 2320° C. to recrystallize the silicon carbide.

Table II below shows the electrical resistivity in ohms/cm.$^3$ at temperatures from 100° F. to 2400° F. for the bodies recrystallized at 2250° C. The last line of the table shows the negative temperature coefficient of electrical resistance factor between 100° F. and 1800° F.

*Table II*

RESISTIVITY-TEMPERATURE CHARACTERISTICS OF BLACK AND GREEN GRAIN MIXES RECRYSTALLIZED AT 2250° C.

| Temp., °F. | Resistivity in Ohm/Centimeter $^3$ | | | | | | | |
|---|---|---|---|---|---|---|---|---|
|  | Mix #3 | Mix #4 | Mix #5 | Mix #6 | Mix #7 | Mix #8 | Mix #9 | Mix #10 |
| 100 | 7.20 | 3.70 | 6.70 | 3.30 | 2.55 | 1.80 | 2.75 | 2.80 |
| 200 | 6.40 | 3.28 | 6.00 | 2.93 | 2.30 | 1.65 | 2.33 | 2.50 |
| 400 | 4.48 | 2.56 | 4.65 | 2.20 | 1.82 | 1.25 | 1.65 | 2.00 |
| 600 | 3.94 | 1.70 | 3.37 | 1.26 | 0.88 | 1.10 | 1.45 |
| 800 | 1.83 | 1.27 | 2.30 | 1.13 | 0.85 | 0.60 | 0.72 | 0.99 |
| 1,000 | 1.31 | 0.84 | 1.61 | 0.88 | 0.63 | 0.42 | 0.50 | 0.66 |
| 1,200 | 0.96 | 0.63 | 1.24 | 0.72 | 0.51 | 0.32 | 0.38 | 0.43 |
| 1,400 | 0.80 | 0.53 | 1.06 | 0.63 | 0.47 | 0.26 | 0.31 | 0.33 |
| 1,600 | 0.78 | 0.52 | 0.98 | 0.61 | 0.48 | 0.26 | 0.30 | 0.29 |
| 1,800 | 0.80 | 0.54 | 0.94 | 0.62 | 0.50 | 0.27 | 0.31 | 0.31 |
| 2,000 | 0.95 | 0.55 | 0.95 | 0.64 | 0.52 | 0.28 | 0.34 | 0.34 |
| 2,200 | 0.79 | 0.56 | 0.91 | 0.63 | 0.54 | 0.30 | 0.36 | 0.37 |
| 2,400 | 0.67 | 0.53 | 0.81 | 0.59 | 0.50 | 0.31 | 0.38 | 0.40 |
| Negative temperature coefficient of electrical resistance factor between 100° F. and 1,800° F. | 9.0 | 6.8 | 7.1 | 5.3 | 5.1 | 6.6 | 8.9 | 9.0 |

Table III below shows the electrical resistivity in ohms/cm.$^3$ at temperatures from 100° F. to 2400° F. for the bodies when recrystallized at 2320° C. The last line of the table shows the negative temperatures coefficient of electrical resistance factor between 100° F. and 1800° F.

Table III

RESISTIVITY-TEMPERATURE CHARACTERISTICS OF BLACK AND GREEN GRAIN MIXES RECRYSTALLIZED AT 2320 °C.

| Temp., °F. | Resistivity in Ohm/Centimeter³ | | | | | | | |
|---|---|---|---|---|---|---|---|---|
| | Mix #3 | Mix #4 | Mix #5 | Mix #6 | Mix #7 | Mix #8 | Mix #9 | Mix #10 |
| 100 | 1.04 | 0.98 | 0.95 | 0.61 | 0.71 | 0.63 | 1.30 | 0.82 |
| 200 | 0.99 | 0.89 | 0.86 | 0.57 | 0.65 | 0.60 | 1.10 | 0.74 |
| 400 | 0.82 | 0.71 | 0.68 | 0.47 | 0.53 | 0.51 | 0.90 | 0.56 |
| 600 | 0.59 | 0.53 | 0.51 | 0.37 | 0.38 | 0.38 | 0.64 | 0.41 |
| 800 | 0.39 | 0.40 | 0.37 | 0.28 | 0.22 | 0.25 | 0.41 | 0.25 |
| 1,000 | 0.28 | 0.29 | 0.26 | 0.22 | 0.15 | 0.16 | 0.26 | 0.17 |
| 1,200 | 0.23 | 0.22 | 0.18 | 0.17 | 0.13 | 0.15 | 0.22 | 0.14 |
| 1,400 | 0.20 | 0.20 | 0.14 | 0.15 | 0.12 | 0.15 | 0.21 | 0.13 |
| 1,600 | 0.18 | 0.20 | 0.13 | 0.15 | 0.12 | 0.15 | 0.22 | 0.13 |
| 1,800 | 0.18 | 0.21 | 0.14 | 0.16 | 0.13 | 0.16 | 0.23 | 0.13 |
| 2,000 | 0.19 | 0.22 | 0.15 | 0.17 | 0.14 | 0.17 | 0.24 | 0.14 |
| 2,200 | 0.20 | 0.23 | 0.16 | 0.18 | 0.15 | 0.18 | 0.26 | 0.15 |
| 2,400 | 0.20 | 0.24 | 0.17 | 0.19 | 0.16 | 0.19 | 0.27 | 0.16 |
| Negative temperature coefficient of electrical resistance factor between 100° F. and 1,800° F. | 5.8 | 4.7 | 6.8 | 3.8 | 5.4 | 3.9 | 5.6 | 6.3 |

Figure 3 depicts in graph form the specific resistance plotted against temperature on a semi logarithmic scale for resistance bodies made from mixes #3 and #10 of Table I when recrystallized at 2320° C. The figure also shows similar curves for bodies made and fired in the same manner from mixes composed entirely of black silicon carbide and composed entirely of green silicon carbide, respectively. Curves for all the mixes of Table I are not included in Figure 3 due to their similarity to the curves for mixes #3 and #10, as can be observed from the data of Table III.

It will be noted that it requires only a very small percentage of green silicon carbide grain to effect a marked change in the negative temperature-electrical resistance characteristics of a recrystallized silicon carbide resistance body. For example, as shown in Figure 3, a resistance body of recrystallized silicon carbide composed of 100% black silicon carbide has an electrical resistance at 1800° F. of between .1 and .2 ohms/cm.³ and an electrical resistance at 100° F. in excess of 200 ohms/cm.³ or a negative temperature coefficient of electrical resistance factor of over 1000, thereby making it impractical for such uses as an electrical resistance heating element. In contrast, an electrical resistance body composed of a recrystallized silicon carbide mixture of black and green silicon carbide containing only 10% silicon carbide of the green variety (see mix #3 of Figure 3) has an electrical resistance at 1800° F. of 0.18 ohms/cm.³ and an electrical resistance at 100° F. of 0.63 ohms/cm.³, or a negative temperature coefficient of electrical resistance factor of 3.9. It is therefore plainly to be observed from the data of Tables II and III and the curves of Figure 3 that the proportions of black and green silicon carbide of the mixture can vary over an extremely wide range and still obtain the beneficial combination of electrical properties.

Inasmuch as a resistance body containing only 10% green silicon carbide with the balance black silicon carbide produces a body with a negative temperature coefficient of electrical resistance factor of under 4, it is plain that recrystallized silicon carbide resistance bodies of satisfactorily low negativity in electrical resistance change with increase in temperature are obtained with as little as 5% or less by weight of green silicon carbide contained in the body. It is further to be noticed that as little as 10% of black silicon carbide provides a distinct increase in the operating voltage level of the resulting resistance body.

Silicon carbide resistance bodies of the herein disclosed type can be made as follows:

Having selected the desired proportion of coarse black and/or green silicon carbide and fine green silicon carbide, or coarse black and/or green silicon carbide and fine black silicon carbide, the mixture of silicon carbide material is then moistened with sodium silicate solution and a temporary agglutinant, the quantity of sodium silicate being kept at a minimum consistent with mechanical strength. Other temporary binders can be used but sodium silicate is preferred. The mix is then molded or consolidated by tamping, extrusion or by any other suitable forming operation and after the rods are tamped in the mold, extruded or otherwise formed, they are given a preliminary baking at around 600° C. to 700° C. so as to provide sufficient strength for handling.

Recrystallization of the molded and baked bodies can be effected in any of the conventional ways. However, I prefer to follow the practice disclosed and fully described in Thompson U.S. Patent No. 2,188,693, issued January 30, 1940. Briefly, the Thompson process consists of passing the molded and baked rods through a graphite tube furnace heated to a temperature of at least 2200° C., and preferably to 2250° C. to 2320° C., the bodies being maintained in the hot zone of the furnace for a period of time required for recrystallization. This period will generally be around 45 minutes and periods in excess of 60 to 90 minutes are preferably to be avoided.

Although I have indicated a preference for the use of the Thompson process as a means of recrystallizing resistors made in accordance with the present invention. The resistors of the present invention can also be made by an alternate technique disclosed in Hediger U.S. Patent 1,906,853 in which the resistors when ready for recrystallization are embedded in a sand-coke mix and an electrical current passed through the bodies to effect the recrystallization.

In the above description I have employed the term "recrystallization." It has been known for some time that when molded shapes of silicon carbide are heated to a sufficiently high temperature the crystals grow together (apparently by evaporation and redeposition) to form a coherent mass which retains its strength even at very high temperatures. In such a process, the crystals are self-bonded and no visible bonding material is used with the exception of a temporary agglutinant. In employing the term "recrystallization" in the specification and claims I do so in the sense thus well known in the art.

Having described the invention in detail, it is desired to claim:

1. A silicon carbide resistance body consisting essentially of a homogeneous, recrystallized body of silicon carbide, the silicon carbide of said body being a mixture of 5% to 90% by weight green silicon carbide and 95% to 10% by weight black silicon carbide, one of said varieties being predominantly of discrete coarse particles and the other variety being predominantly in the form of a semi-continuous recrystallized phase.

2. A silicon carbide resistance body consisting essentially of 95% to 10% by weight coarse particles of black silicon carbide held together by a homogeneous, recrystallized network of 5% to 90% by weight green silicon carbide, said green silicon carbide forming coatings on and conductive bridges between the substantially discrete particles of black silicon carbide.

3. A silicon carbide heating element, at least the heating portion thereof consisting essentially of a homogeneous, recrystallized mass of 95% to 10% by weight black and 5% to 90% by weight green silicon carbide.

4. A silicon carbide resistance body consisting essentially of 5% to 90% by weight coarse particles of green silicon carbide held together by a homogeneous, recrystallized network of 95% to 10% by weight black silicon carbide, said black silicon carbide forming coatings on and conductive bridges between the substantially discrete particles of green silicon carbide.

5. A silicon carbide resistance body comprising a homogeneous, recrystallized mass of silicon carbide composed predominantly of 95% to 10% by weight discrete particles of black silicon carbide held together by a recrystallized network of 5% to 90% by weight green silicon carbide.

6. A silicon carbide resistance body comprising a homogeneous, recrystallized mass of silicon carbide composed predominantly of 95% to 10% by weight discrete particles of black silicon carbide held together by a recrystallized network of 5% to 90% by weight green silicon carbide, said body having a negative temperature coefficient of electrical resistance factor between room temperature and 1000° C. of less than 4.

7. A silicon carbide resistance body comprising a homogeneous, recrystallized mass of silicon carbide composed predominantly of 95% to 10% by weight discrete particles of black silicon carbide held together by a recrystallized network of 5% to 90% by weight green silicon carbide, said body having a negative temperature coefficient of electrical resistance factor between room temperature and its normal operating temperature of less than 4.

8. A silicon carbide resistance body comprising a homogeneous, recrystallized mass of silicon carbide composed predominantly of 95% to 10% by weight discrete particles of black silicon carbide held together by a recrystallized network of 5% to 90% by weight green silicon carbide, said body having a negative temperature coefficient of electrical resistance factor between room temperature and its normal operating temperature of less than 4 and a specific electrical resistance in ohms/cc. at 1000° C. of 0.2–1.0.

9. A silicon carbide resistance body comprising a homogeneous, recrystallized mass of silicon carbide composed predominantly of 5% to 90% by weight discrete particles of green silicon carbide held together by a recrystallized network of 95% to 10% by weight black silicon carbide, said body having a negative temperature coefficient of electrical resistance factor between room temperature and its normal operating temperature of less than 5.

10. A silicon carbide resistance body comprising a homogeneous, recrystallized mass of silicon carbide composed of about 50% by weight of discrete particles of coarse grit black silicon carbide held together by about 50% by weight of a recrystallized network of green silicon carbide.

11. A silicon carbide resistance body comprising a homogeneous, recrystallized mass of silicon carbide composed of about 50% by weight of discrete particles of coarse grit green silicon carbide held together by about 50% by weight of a recrystallized network of black silicon carbide.

12. A silicon carbide resistance body consisting essentially of a homogeneous, recrystallized mass of 95% to 10% by weight black and 5% to 90% by weight green silicon carbide, said body having a negative temperature coefficient of electrical resistance factor between 100° F. and 1800° F. of less than 10.

13. A silicon carbide resistance body consisting essentially of a homogeneous, recrystallized body of silicon carbide, the silicon carbide of said body being a mixture of 10% to 90% by weight of green silicon carbide and 90% to 10% by weight of black silicon carbide.

References Cited in the file of this patent

UNITED STATES PATENTS

| | | |
|---|---|---|
| 1,906,853 | Hediger | May 2, 1933 |
| 1,989,736 | Boyles | Feb. 5, 1935 |
| 2,431,327 | Geiger | Nov. 25, 1947 |

UNITED STATES PATENT OFFICE

CERTIFICATE OF CORRECTION

Patent No. 2,941,962            June 21, 1960

Roland R. Van Der Beck, Jr.

It is hereby certified that error appears in the above numbered patent requiring correction and that the said Letters Patent should read as corrected below.

Column 4, line 43, for "12-40" read -- 100-140 --; column 6, line 12, after "mixes" insert -- # --; column 8, lines 27 and 28, for "invention. The" read -- invention, the --.

Signed and sealed this 23rd day of October 1962.

(SEAL)
Attest:

ERNEST W. SWIDER            DAVID L. LADD
Attesting Officer            Commissioner of Patents